(12) United States Patent
Laukemann

(10) Patent No.: US 7,845,477 B2
(45) Date of Patent: Dec. 7, 2010

(54) AUTOMOTIVE DRIVE COMPRISING A WATER-BASED RETARDER

(75) Inventor: Dieter Laukemann, Vellberg (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 1024 days.

(21) Appl. No.: 10/572,039

(22) PCT Filed: Sep. 8, 2004

(86) PCT No.: PCT/EP2004/009992

§ 371 (c)(1),
(2), (4) Date: Nov. 15, 2006

(87) PCT Pub. No.: WO2005/025957

PCT Pub. Date: Mar. 24, 2005

(65) Prior Publication Data

US 2007/0102251 A1     May 10, 2007

(30) Foreign Application Priority Data

Sep. 15, 2003  (DE) ................. 103 42 869

(51) Int. Cl.
*F16D 57/02* (2006.01)

(52) U.S. Cl. .................................. 188/296

(58) Field of Classification Search ............. 188/296, 188/290, 293, 297, 306, 307, 308; 192/12 B, 192/216

See application file for complete search history.

(56) References Cited

U.S. PATENT DOCUMENTS

| | | | | | |
|---|---|---|---|---|---|
| 3,744,598 | A | * | 7/1973 | Hanke et al. ................. | 188/296 |
| 3,774,735 | A | * | 11/1973 | Hanke et al. ................. | 188/296 |
| 4,458,792 | A | * | 7/1984 | Thomas et al. .............. | 188/296 |
| 4,836,341 | A | | 6/1989 | Hall, III ....................... | 188/290 |
| 5,794,588 | A | | 8/1998 | Vogelsang et al. ........... | 123/320 |
| 5,829,562 | A | * | 11/1998 | Adams et al. ................ | 192/218 |
| 2005/0016804 | A1 | * | 1/2005 | Vogelsang et al. ........... | 188/296 |

FOREIGN PATENT DOCUMENTS

DE         100 54 078         5/2002

* cited by examiner

*Primary Examiner*—Xuan Lan Nguyen
(74) *Attorney, Agent, or Firm*—Ohlandt, Greeley Ruggiero & Perle, L.L.P.

(57) ABSTRACT

The invention relates to an automotive drive, comprising a cooling circuit with a coolant, a retarder having a rotor and a stator that together form a toroidal working chamber, with the coolant being the working medium of the retarder. The retarder has an inlet for feeding the working medium from the cooling circuit and an outlet for discharging the working medium into the cooling circuit. The present automotive drive is characterized by the following features: the retarder has an additional evacuation outlet, which communicates with the cooling circuit so as to carry the working medium; a leakage pump is interposed in the connection between the evacuation outlet and the cooling circuit.

16 Claims, 2 Drawing Sheets

AUTOMOTIVE DRIVE COMPRISING A WATER-BASED RETARDER

BACKGROUND OF THE PRESENT INVENTION

1. Field of the Invention

The present invention relates to an automotive drive with a water retarder. The invention relates, in particular, to a device and a method for adjusting the optimal residual quantity of working medium in the working chamber of the retarder during non-braking operation.

2. Description of the Related Art

Retarders have been widely known in the art for a long time. Traditionally, conventional retarders have been operated with oil as the working medium. There has recently been an increasing tendency, however, to place the retarder directly in the cooling circuit of the motor vehicle and to utilize the coolant of the motor vehicle simultaneously as the working medium of the retarder. This is advantageous because it makes it possible to dispense with a separate oil circuit for operating the retarder. The heat that accumulates in the retarder can be dissipated directly via the cooling circuit of the motor vehicle.

During non-braking operation, the power loss of the retarder should be kept as low as possible. To this end, the retarder is largely emptied on shifting from braking operation to non-braking operation. Optimally, however, a predetermined residual quantity of working medium remains in the working chamber of the retarder. Up to now, it has been customary to discharge the working medium up to the predetermined residual quantity by means of the pressure produced in the retarder or, optionally, by means of additional, externally imposed pressure impulses. An absolute leak tightness of the sealing elements that seal the working chamber prevents a leakage flow into the working chamber of the retarder and, in this way, the optimal residual quantity of working medium in the working chamber is kept constant during non-braking operation.

There are several drawbacks to an absolute leak-tightness of all elements that seal the working chamber, such as the shaft seals or valves arranged in the cooling circuit that close off the branch of the cooling circuit in which the retarder is disposed from the remaining cooling circuit during non-braking operation. Extremely high-grade, precisely manufactured elements, which are expensive, can only be used. In addition, even slight wear after a short period of operation leads to the necessity of replacing these elements.

Accordingly, there is a need for a retarder that avoids the above-mentioned disadvantages of currently available systems.

SUMMARY OF THE INVENTION

The present invention provides a retarder for an automotive system that is integrated into the cooling circuit of the automobile and utilizes the cooling fluid as a working medium.

The present invention further provides a retarder that improves on the equipment cost of current retarders by using less expensive parts.

The present invention still further provides a long-life retarder whose components do not have to be replaced frequently.

These and other objects and advantages of the present invention are provided by an automotive drive comprising a retarder, and a method for adjusting an optimal residual quantity of working medium in the working chamber of such a retarder during non-braking operation.

The automotive drive of the invention has a retarder, the working medium of which is the coolant of the motor vehicle. The working medium is fed from the cooling circuit of the motor vehicle via an inlet to the retarder. It then flows into the working chamber of the retarder, which is formed by the rotor blade wheel and the stator blade wheel, and is discharged via an outlet back into the cooling circuit. The retarder has an additional outlet, and evacuation outlet, for discharging the excess residual quantity of working medium from the working chamber of the retarder and into the cooling circuit of the motor vehicle during non-braking operation. The evacuation outlet is therefore connected to the cooling circuit and carries the working medium.

In order to ensure that an optimal residual quantity of working medium in the working chamber of the retarder during non-braking operation, a leakage pump is connected to the evacuation outlet and pumps the working medium out of the working chamber via the evacuation outlet into the cooling circuit. This is achieved by setting the tap point of the leakage pump is so that only the excess quantity of working medium is pumped off. The tap point is located in the direction of flow behind outlet holes introduced into the stator of the retarder. An overflow edge can be provided, especially in the direction of flow before the tap point, so that only "overflowing" working medium is pumped off.

The arrangement of the leakage pump in the present invention precludes the need for absolutely leak-tight seals and, if need be, valves that seal the working chamber of the retarder. This is especially true for those seals and valves that are impinged on both sides by the coolant of the cooling circuit. Such seals and/or valves include the shaft seals of the retarder rotor, which are lubricated and/or cooled by the coolant of the motor vehicle, and the valves that close off the branch of the cooling circuit in which the retarder is disposed from the remaining cooling circuit of the motor vehicle.

With respect to the rotor seals that are exposed to coolant, it is even possible to adjust a predetermined leakage flow into the working chamber of the retarder during non-braking operation, this leakage flow being discharged once again by the leakage pump arranged in accordance with the invention. The retarder and the shaft seal(s) are effectively cooled by this leakage flow, because heat is dissipated via this leakage flow into the cooling circuit of the motor vehicle. Finally, because the leakage pump maintains an optimal residual amount of working medium in the retarder during non-braking operation, power loss of the retarder during idling is reliably prevented, in spite of the lack of tightness of the seals of the working chamber.

The shaft seals that seal the retarder against the surroundings are advantageously constructed in an absolutely leak-tight manner in order to prevent an uncontrolled escape of coolant or working medium from the retarder into the ambient surroundings.

The leakage pump arranged in accordance with the invention is driven by an electric motor, the retarder shaft, or the compressed air supply of the motor vehicle. Preferably, the leakage pump is disposed directly on the retarder shaft, so that it is possible to dispense with interposed elements that transmit the drive torque. In this way, the leakage pump is driven with particularly low power loss. In an especially preferred embodiment, it is possible to dispense with an additional drive for the leakage pump by constructing the leakage pump as a water-jet pump that is integrated into the cooling circuit of the motor vehicle. In such a construction, the drive work of the leakage pump is performed indirectly by the water pump arranged in the cooling circuit of the motor vehicle. It is also preferred to provide a bypass in order to circumvent the leakage pump during braking operation of the retarder, because working medium can then be discharged from the working chamber of the retarder exclusively via the outlet mentioned for discharging the working medium.

The leakage pump can be a piston pump, as a membrane pump, or a centrifugal pump. The present invention also contemplates the use of any other suitable device for the leakage pump.

The above described and other features and advantages of the present invention will be appreciated and understood by those skilled in the art from the following detailed description and drawings.

DETAILED DESCRIPTION OF THE INVENTION

Figure 1:
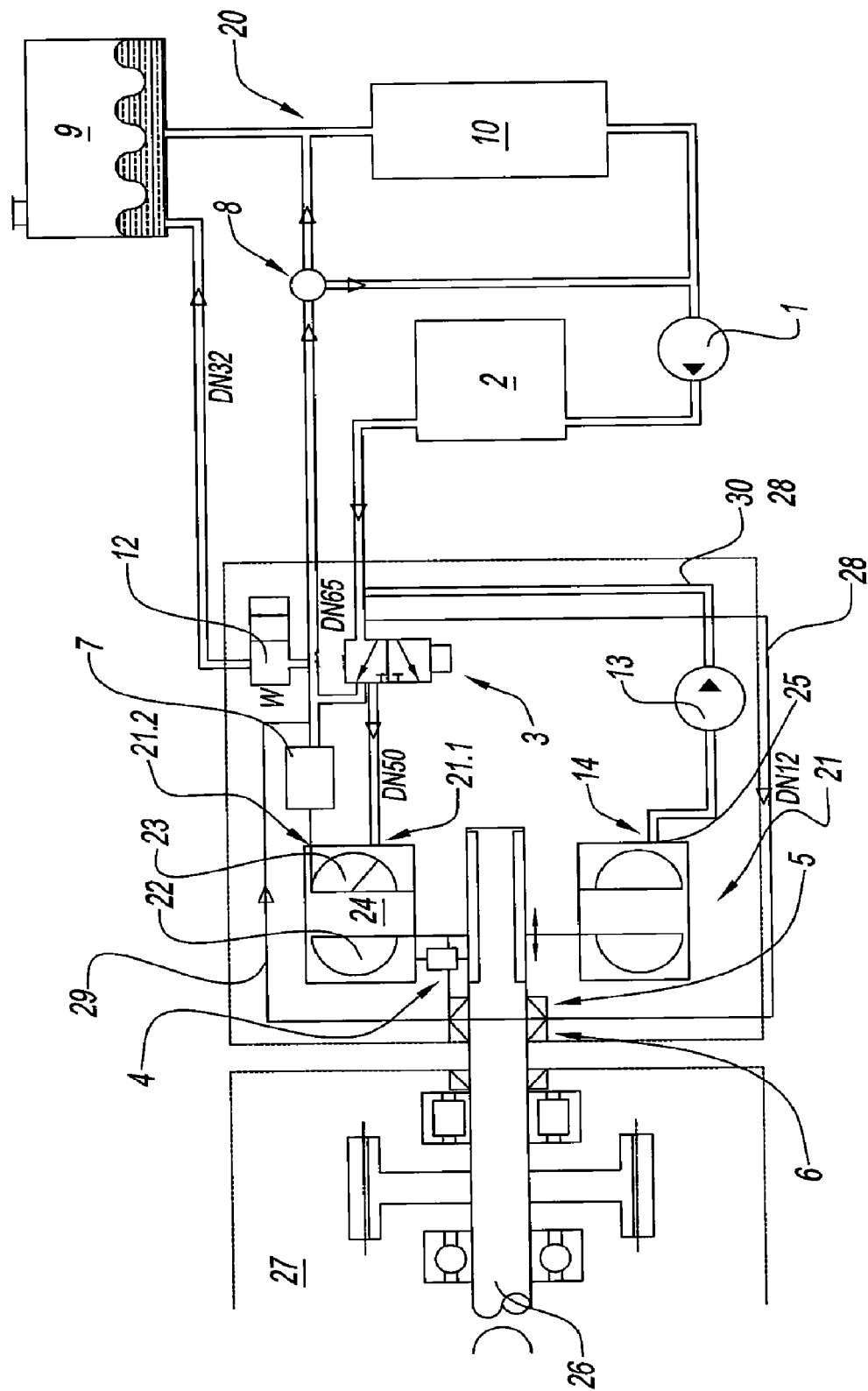
FIG. 1 is a schematic diagram of an embodiment of an automotive driveline of he present invention.

Referring to FIG. 1, a cooling circuit 20 of the automotive drive of the present invention is shown. A coolant is circulated by means of a cooling water pump 1 in the cooling circuit. In the shown embodiment, the coolant is water or a water-glycol mixture. However, the present invention contemplates the use of any coolant that would be suitable for such an automotive drive.

By means of the coolant, an engine 2 is cooled and simultaneously, during braking operation, a retarder 21 is operated. The coolant in turn is cooled by means of a radiator 10, which is can be a conventional motor vehicle radiator. A thermostat or a thermostatic valve 8 is disposed in the direction of flow (noted by the directional arrows in FIG. 1) in front of the radiator 10, and divides the flow of coolant into a line to the radiator 10 and a bypass to radiator 10. The amount of coolant allowed to pass into radiator 10 and/or the bypass line depends on the amount of cooling required and is controlled by thermostatic valve 8. For example, all of the coolant can be directed to radiator 10, through the bypass line, or any mixture thereof.

Fluctuations in the coolant flow are compensated for by means of an equalizing tank 9. An overpressure in the cooling circuit, for example, due to rapid draining of the retarder on shifting from braking operation to non-braking operation can be compensated for by a pressure-limiting valve 12 and the line opening into the equalizing tank 9. Thus, when pressure-limiting valve 12 detects a coolant pressure that is above a certain value, it can divert some of the coolant into equalizing tank 9.

By means of a 3/2-way valve 3, it is possible to open up or close off the cooling circuit branch in which the retarder 21 is arranged to or from the remaining cooling circuit 20. During braking operation, the coolant flows via the line shown (DN 50) to an inlet 21.1. Via channels in a stator 23, the coolant enters a working chamber 24 of the retarder, where it brakes a rotor 22. Via the outlet holes in the stator 23, the coolant or working medium is carried into a drainage channel, which is formed in the stator housing, and is discharged via an outlet 21.2 from the retarder. Subsequently, it flows through a control valve 7 back into the cooling circuit of the motor vehicle, where, as needed, it is cooled by the radiator 10.

The retarder depicted has an axially adjustable rotor 22. Rotor 22 is mounted on a rotor shaft 26 by means of an adjustable thread. Accordingly, during braking operation, the rotor 22 can travel to a position that is close against the stator 23 and, during non-braking operation, it can travel to an axial position distant from stator 23 so as to minimize the power loss. It is preferred for this back-and-forth travel to occur automatically.

The retarder is mounted in an overhung manner on the rotor shaft 26, which is carried in a transmission 27. The shaft seal that seals the working chamber 24 from the surroundings is constructed in two parts. It consists, as depicted, of an absolutely leak-tight, outer sliding ring packing 6 and a special seal 5 that is permeable to the working medium. The space between the two seals 5, 6 is impinged by coolant by way of a line 28, and this coolant flows through the special seal along the rotor 26 to a throttling point, which is constructed as a split ring seal 4, and then further into the working chamber 24 of the retarder 21. Furthermore, the coolant can also be carried back via the line 29, which, as a discharge line, connects the space between the seals 5, 6 directly to the cooling circuit 20.

In addition to the outlet 21.2, the retarder 21 further comprises an evacuation outlet 25 for discharging the working medium from the retarder into the cooling circuit 20 during non-braking operation. The evacuation outlet 25 is connected via a line 30 to the cooling circuit 20 at a point that in front of the 3/2-way valve 3 in the direction of coolant flow. Placed in the line 30 is a leakage pump 13 for purposefully pumping off excess working medium out of the working chamber of the retarder during non-braking operation.

By means of this leakage pump 13, working medium that during non-braking operation flows via the shaft seal 5 into the working chamber of the retarder 21 can be pumped off into the cooling circuit 20, so that the power loss of the retarder 21 is kept optimally low during non-braking operation. Furthermore, lack of tightness between the cooling circuit 20 and the cooling branch in which the retarder 21 is arranged—for example, of the valve 3 or of the valve 7—can be compensated for by pumping off the leakage flows by means of the pump 13.

Figure 2:
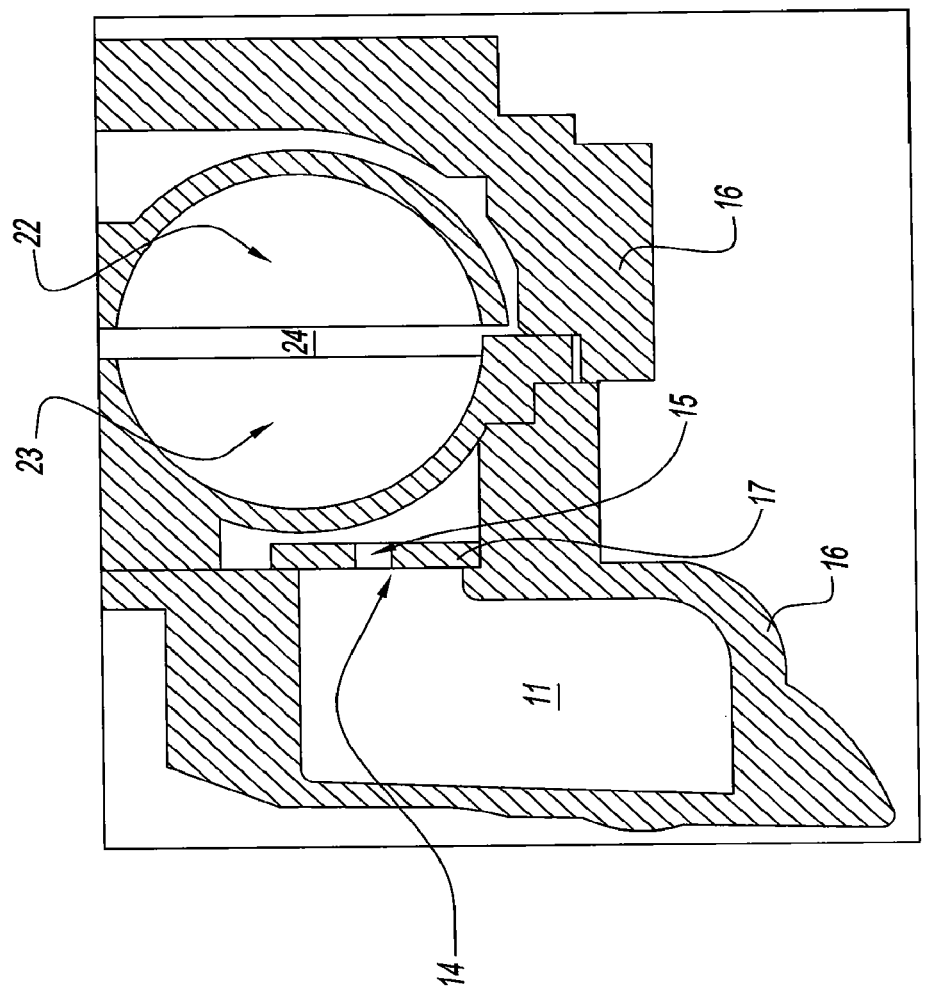
FIG. 2 is a cross-sectional view of a tap point of the leakage pump in of the present invention.

Referring to FIG. 2, the construction design of the overflow edge 14 in the stator 23 of the retarder 21 is shown. As is discussed above and shown in greater detail in FIG. 2, rotor 22 and the stator 23 together form the working chamber 24. The two are enclosed by a housing 16.

An evacuation channel 11 is formed in this housing on the stator side. The working medium is carried from the working chamber 24 through outlet openings (not shown) in the stator 23 into the evacuation channel 11. An overflow edge 14 is formed between the evacuation channel 11 and the stator 23, that is, between the evacuation channel and the walls or shell of the stator 23 that is provided with the outlet holes mentioned.

In the shown embodiment, the overflow edge 14 is produced by providing a washer 17, which is mounted in the housing 16 and is provided with a plurality of holes 15 in the axial direction of the retarder. In the present example, the washer is mounted on its face in the axial direction on two housing projections of the housing 16 and defines the boundary of the evacuation channel 11 in the axial direction. On the one hand, the holes 15 create the overflow edge 14 and, on the other hand, they produce an outlet throttle, the throttling action of which is adjusted by way of the cross section and the number of holes 15.

In place of the holes 15 that are shown, oblong holes or slots—for example, a circumferential slot—could also be provided.

As discussed above, the drive of the leakage pump 13 can be constructed in different ways. Preferably, the leakage pump 13 is arranged, for example, on the rotor shaft 26 of the retarder 21 or is driven indirectly by the rotor shaft 26. The leakage pump 13 need be switched on only during non-braking operation. However, it is also possible to allow the leakage pump 13 to be driven by the rotor shaft 26 during braking operation of the retarder in order to additionally dissipate drive energy from the retarder 21 and thus to increase the braking torque.

The present invention having been thus described with particular reference to the preferred forms thereof, it will be obvious that various changes and modifications may be made therein without departing from the spirit and scope of the present invention as defined herein.

List of Reference Numbers

1 water pump
2 engine
3 3/2-way valve
4 split ring seal
5 special seal
6 sliding ring packing
7 control valve
8 thermostat
9 equalizing tank
10 radiator
11 evacuation channel
12 pressure-limiting valve
13 leakage pump
14 overflow edge
15 holes
16 housing
17 washer
20 cooling circuit
21 retarder
21.1 inlet
21.2 outlet
22 rotor
23 stator
24 working chamber
25 evacuation outlet
26 rotor shaft
27 transmission
28 line
29 line
30 line

The invention claimed is:

1. An automotive drive comprising:
a cooling circuit, wherein a coolant is circulated in the cooling circuit by a pump;
a retarder comprising a rotor and a stator, wherein the rotor and stator at least partially define a toroidal working chamber, wherein the coolant is the working medium of the retarder, the retarder further comprising:
an inlet for feeding the working medium from the cooling circuit and an outlet for discharging the working medium into the cooling circuit, and
an evacuation outlet in communication with a leakage pump, wherein the leakage pump is between the evacuation outlet and the cooling circuit.

2. The automotive drive of claim 1, wherein the working medium exits out of the working chamber via the evacuation outlet into the cooling circuit, and a predetermined residual quantity of working medium continuously remains in the working chamber.

3. The automotive drive of claim 2, further comprising an overflow edge upstream of the evacuation outlet.

4. The automotive drive of claim 1, wherein the retarder further comprises a rotor shaft sealingly connected by at least one seal to the retarder housing, the at least one seal being impinged by the coolant, wherein the at least one seal provides a leak-tight seal with ambient surroundings and is permeable to the working chamber of the retarder by a predetermined amount of leakage.

5. The automotive drive of claim 1, wherein the leakage pump is driven by one of an electric motor, the rotor shaft of the retarder, or the compressed air supply of the motor vehicle.

6. The automotive drive of claim 1, wherein the leakage pump is a piston pump, a membrane pump, or a centrifugal pump.

7. The automotive drive of claim 1, wherein the leakage pump is a water-jet pump in the cooling circuit and driven by the coolant.

8. A retarder comprising: a rotor and a stator, wherein the rotor and stator at least partially define a toroidal working chamber; an inlet and an outlet; an evacuation outlet; and a leakage pump, wherein the retarder is operably connected to a cooling circuit, wherein coolant enters the retarder through the inlet and evacuates the retarder through the outlet and through the evacuation outlet, and wherein the leakage pump is between the cooling circuit and the evacuation outlet.

9. The retarder of claim 8, wherein the working medium exits out of the working chamber via the evacuation outlet into the cooling circuit such that a predetermined residual quantity of working medium constantly remains in the working chamber.

10. The retarder of claim 9, further comprising an overflow edge upstream of the evacuation outlet.

11. The retarder of claim 8, wherein the retarder further comprises a rotor shaft sealingly connected by at least one seal with respect to the retarder housing, the at least one seal being impinged by the coolant, wherein the at least one seal provides a leak-tight seal with ambient surroundings and is permeable to the working chamber of the retarder by a predetermined amount of leakage.

12. The retarder of claim 8, wherein the leakage pump is driven by at least one of an electric motor, the rotor shaft of the retarder, or the compressed air supply of the motor vehicle.

13. The retarder of claim 8, wherein the leakage pump is a piston pump, a membrane pump, or a centrifugal pump.

14. The retarder of claim 8, wherein the leakage pump is a water-jet pump, which is integrated into the cooling circuit and driven by the coolant.

15. A method of adjusting an optimal residual quantity of the working medium in the retarder of claim 1 during non-braking operation, comprising pumping a quantity of the working medium that exceeds a predetermined quantity in the toroidal working chamber of the retarder out of the toroidal working chamber of the retarder with the leakage pump, and pumping the working medium into the cooling circuit.

16. The method according to claim 15, wherein the leakage pump is disposed directly on a rotor shaft of the retarder or is driven indirectly by the retarder, and wherein the leakage pump is also driven during braking operation of the retarder.

* * * * *